(12) United States Patent
Hodge et al.

(10) Patent No.: US 8,868,940 B2
(45) Date of Patent: Oct. 21, 2014

(54) SYSTEMS APPARATUS AND METHOD FOR BLOCKING POWER TRANSITION IN RESPONSE TO A COMPARISION WITH PRESENT SYSTEM STATE

(75) Inventors: Richard H. Hodge, Spring, TX (US); Monji Jabori, Houston, TX (US); John Powell, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 261 days.

(21) Appl. No.: 13/386,132

(22) PCT Filed: Jan. 11, 2010

(86) PCT No.: PCT/US2010/020669
§ 371 (c)(1),
(2), (4) Date: Apr. 11, 2012

(87) PCT Pub. No.: WO2011/068548
PCT Pub. Date: Jun. 9, 2011

(65) Prior Publication Data
US 2012/0191990 A1 Jul. 26, 2012

Related U.S. Application Data

(60) Provisional application No. 61/267,036, filed on Dec. 5, 2009.

(51) Int. Cl.
*G06F 1/00* (2006.01)
*G06F 1/26* (2006.01)
*G06F 11/30* (2006.01)
*G06F 1/32* (2006.01)

(52) U.S. Cl.
CPC .......... *G06F 11/3055* (2013.01); *G06F 1/3203* (2013.01)

USPC ........................................... 713/300; 713/324

(58) Field of Classification Search
CPC ................ G06F 1/00; G06F 1/26; G06F 1/32
USPC ........................................ 713/300, 324, 340
See application file for complete search history.

(56) References Cited

U.S. PATENT DOCUMENTS 5,708,819 A   1/1998   Dunnihoo
6,148,390 A * 11/2000   MacArthur et al. ............ 712/37
(Continued)

FOREIGN PATENT DOCUMENTS

KR   20030002163   1/2003
KR   10-0672931    1/2007

OTHER PUBLICATIONS

International Searching Authority, International Search Report and Written Opinion, Appln No. PCT/US2010/020669 date of mailing Dec. 15, 2010, 9 p.

*Primary Examiner* — Chun Cao
*Assistant Examiner* — Phil Nguyen

(57) ABSTRACT

Systems, apparatus, and methods are disclosed for blocking a power-transition. The method discloses: receiving a power-transition signal; monitoring a present-state of the computer; comparing the present-state of the computer, to a predetermined set of blocked power-transition states; and blocking the power-transition signal from being effected, if the present-state of the computer corresponds to one of the blocked power-transition states. The system discloses: blocked power-transition states; a power control module, and a power control circuit. The apparatus discloses: a blocking switch, and a power control module.

15 Claims, 6 Drawing Sheets

(56) References Cited

U.S. PATENT DOCUMENTS

| | | | |
|---|---|---|---|
| 6,360,327 B1* | 3/2002 | Hobson | 713/300 |
| 6,747,911 B2* | 6/2004 | Roohparvar | 365/233.1 |
| 7,805,624 B2* | 9/2010 | Inai | 713/310 |
| 2002/0032877 A1* | 3/2002 | Iwaki | 713/320 |
| 2004/0073842 A1 | 4/2004 | Don et al. | |
| 2005/0055589 A1* | 3/2005 | Kojo | 713/300 |
| 2005/0108584 A1* | 5/2005 | Kawakami et al. | 713/300 |
| 2007/0040894 A1* | 2/2007 | Kikugawa | 348/14.01 |
| 2007/0162675 A1* | 7/2007 | Sugiura et al. | 710/260 |
| 2007/0234084 A1* | 10/2007 | Furuta | 713/300 |
| 2012/0030490 A1* | 2/2012 | Makino et al. | 713/323 |

* cited by examiner

SYSTEMS APPARATUS AND METHOD FOR BLOCKING POWER TRANSITION IN RESPONSE TO A COMPARISION WITH PRESENT SYSTEM STATE

CROSS-REFERENCE TO RELATED APPLICATION

This application is a national stage application under 35 U.S.C. §371 of PCT/US2010/020669, filed Jan. 11, 2010, which claims the benefit of U.S. Provisional Application No. 61/267,036, filed Dec. 5, 2009.

BACKGROUND OF THE INVENTION

Field of the Invention

The present invention relates generally to systems, apparatus, and methods for power management, and more particularly to techniques for blocking power-transitions.

BRIEF DESCRIPTION OF THE DRAWINGS

Some examples of the invention are described in the following figures.

DETAILED DESCRIPTION

Figure 1:
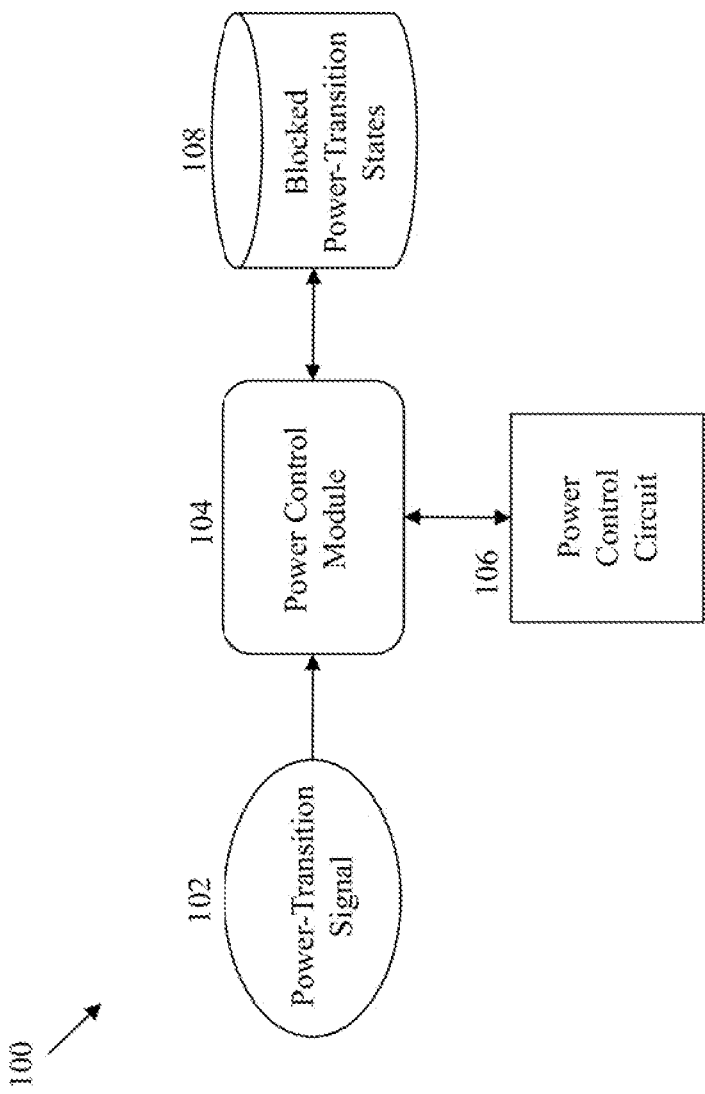
FIG. 1 is one example of a system for blocking a power-transition.

Computer systems, both personal and commercial, are increasingly being managed to a greater and greater degree. As such, there are often critical times when certain computer systems should not undergo "power-transitions" (e.g. "powered-off", placed in "standby-mode", placed in "sleep-mode", etc.). Such critical times include during the operation of computer or network maintenance or update activities.

For example, most computers must have either their firmware and/or software updated on a regular basis so as to keep such computers operating at the peak of efficiency and protected from modern security and computer virus threats. Often during the updating process the computer power-state must not be transitioned (e.g. powered-off), so that certain (e.g. critical, essential, etc.) computer elements are not corrupted, perhaps irretrievably. "Computer elements" (or just "elements") are herein defined to include any and all hardware, software, firmware, instructions, data, code, files, passwords, etc. associated with a computer operating either stand-alone, or as part of a network. "Computer elements" also include BIOS and boot-block elements.

However, in many desktop, notebook, and other types of computer systems, pressing a power-button continuously for a predetermined time period (e.g. typically 4 seconds) results in a hardware generated (e.g. hard-reset) forced shut-down. While such a feature may allow a user, or network administrator, to resolve a lock-up scenario when the OS is unresponsive, there are critical times where this feature can corrupt various computer elements.

For example, during a computer BIOS update (which often can take from 30 to 90 seconds), if the user shuts-off power (perhaps because the computer display screen is typically non-functional during this period and the user may thus speculate that the system is locked-up and needs to be forcibly powered-off), the system BIOS will almost certainly be corrupted (e.g. various non-volatile memory elements, such as ROMs, on the computer's motherboard might need to be manually removed and re-programmed with a new BIOS, all at substantial cost).

BIOS files, are one type of computer element, which if corrupted during an update process, may result at the very least in a service call, and at most, requiring physical removal of hardware so that ROMs or other non-volatile memory devices can be manually reprogrammed, often at a substantial cost in downtime and/or financially. The BIOS defines a firmware interface between the computer's "hardware" and the computer's "operating system", and after a computer's power-button is pressed, the BIOS is typically the first code executed by the computer. The BIOS then initializes the computer's hardware devices, before the computer's operating system is loaded.

Such undesirable power-transitions in the past have not been too troublesome since the BIOS has usually not had to been updated too often, however more recently, new computing solutions require inclusion of more code in the BIOS, and with new threats attacking a computer's BIOS, critical firmware and software, such as the BIOS, needs to be updated more frequently.

Even computers employing more robust "BIOS recovery strategies", such as those storing a backup copy of the BIOS in a recovery partition of memory, need at least a "minimal portion" of the BIOS to be operational (i.e. not corrupted) so that the recovery strategy can retrieve the recovery-BIOS. This "minimal portion" of the BIOS is sometimes called a "boot-block".

Computer elements corrupted or damaged due to undesirable power-transitions can be a particularly acute problem in a networked environment where a large number of security or other updates are distributed over a network, such that a significant number of critical computer elements are being simultaneously updated, and inadvertently corrupted.

The present invention addresses and remedies many, if not all, of the problems discussed above, by presenting various systems, apparatus, and methods for blocking power-transitions. Details of the present invention are now discussed.

FIG. 1 is one example of a system 100 for blocking a power-transition. In the system 100, a power-transition signal 102 is a signal requesting a change in the power-state of the system 100. For example, the power-transition signal 102 is a "power-off-transition" signal/request when the signal is requesting that the system 100 be changed from "a current state" to an "off-state". Note that an "off-state" does not necessarily mean a complete absence of power within the system 100, but may pertain to only a predetermined portion of the system 100 (e.g. some computers can still act as stand-alone hardware devices and play DVDs and other media while the computer itself can be deemed "off" since the operating system is not executing or the computer is not "booted up".) System 100 power-states include, but are not limited to: a "power-off" state, a "power-on" state, a "standby" state, a "sleep-mode" state, and "any other power-states" that are defined within the system 100. System power-transitions include, but are not limited to: "on" to "off", "on" to "standby", "on" to "steep-mode", and so on.

The power-transition signal 102, can be generated: in response to a power-button being "pressed"; from another element within the system 100; or received from a network coupled to the system 100. For example, if the system 100 is a computer, a "briefly pressed" power-button effects a normal "power-off" sequence. The duration of the power-transition signal 102 is fairly short (e.g. a, typically for less than a second). However, if the power-button is "pressed and held" (typically for at least 4 seconds), a forced power-transition (e.g. "on" to "off") is effected. The "power-button" can be any type of device having at least two distinguishable states.

A power control module 104 receives the power-transition signal 102. The power control module 104 also monitors a present-state of the system 100. Upon receiving the power-transition signal 102, the power control module 104 compares the present-state of the system 100 to a predetermined set of blocked power-transition states 108. The blocked power-transition states 108 correspond to certain power-transitions which are not permitted when the system 100, or certain elements within the system 100, are in certain states of operation. One example set of the blocked power-transition states 108 is presented below.

If the power control module 104 determines that the present-state of the system 100 is in one of the blocked power-transition states 108, then the power control module 104 prevents a power control circuit 106 from transitioning (i.e. changing) a present power-state of the system 100 to one or more of the blocked power-states 108. For example, in a first present-state of the system 100, a power-transition from "power-on" to "power-off" may be permitted, but not "power-on" to "power-standby"; while in a second present-state of the system 100, any power-transition from "power-on" to "another power state" may be permitted; and so on depending upon how the system 100 is set-up by a user, a system administrator, a policy, or some other authority.

The following three lists present examples of sets of possible blocked and permitted power-transition states 108. In a first list, a power-transition from "power-on" to "power-off" is to be blocked if:
  a computer element is in a first predetermined state;
  a computer element is transitioning between first set of predetermined states;
  BIOS is being updated;
  a boot-block is being updated;
  certain computer elements are being loaded, installed, updated, repaired, or restored within the system 100;
  a predetermined set of computer code or a software application is executing;
  a predetermined set of computer hardware is, will be, or has been present or in a certain operational state; (e.g. power must be kept on until a hardware element previously operating at high-power, has a chance to be "cooled-down" by a fan);
  the system 100 is in one or more predefined "temporal" states (e.g. at certain scheduled or unscheduled times during the day, week, month, etc.); or
  the system 100 is in one or more predefined "network" states (e.g. such as when a critical security update is being installed).

In a second list, a power-transition from "power-on" to "power-off" is to be permitted if:
  the power control module 104 determines that the system 100 is in a non-functional (e.g. error, or "hung") state.

The apparatus to be presented in FIGS. 2, 3, 4, and 5 (discussed below) show various examples of how the power control module 104, the power control circuit 106, and the blocked power-transition states 108 of the system 100 can be implemented within a computer in response to a power-transition signal 102. Note that in some cases the functionality within one or more of the system's 100 elements (i.e. 104, 106, and 108) may be distributed over more that one of the elements in these apparatus 200, 300, 400, and 500. Functionality within one example of the power control circuit 106 is implemented using one or more switches (e.g. nFETs, pFETs, or other switching devices) arranged together to prevent voltage leaks between different voltage rails powering various elements with the system 100.

Figure 2:
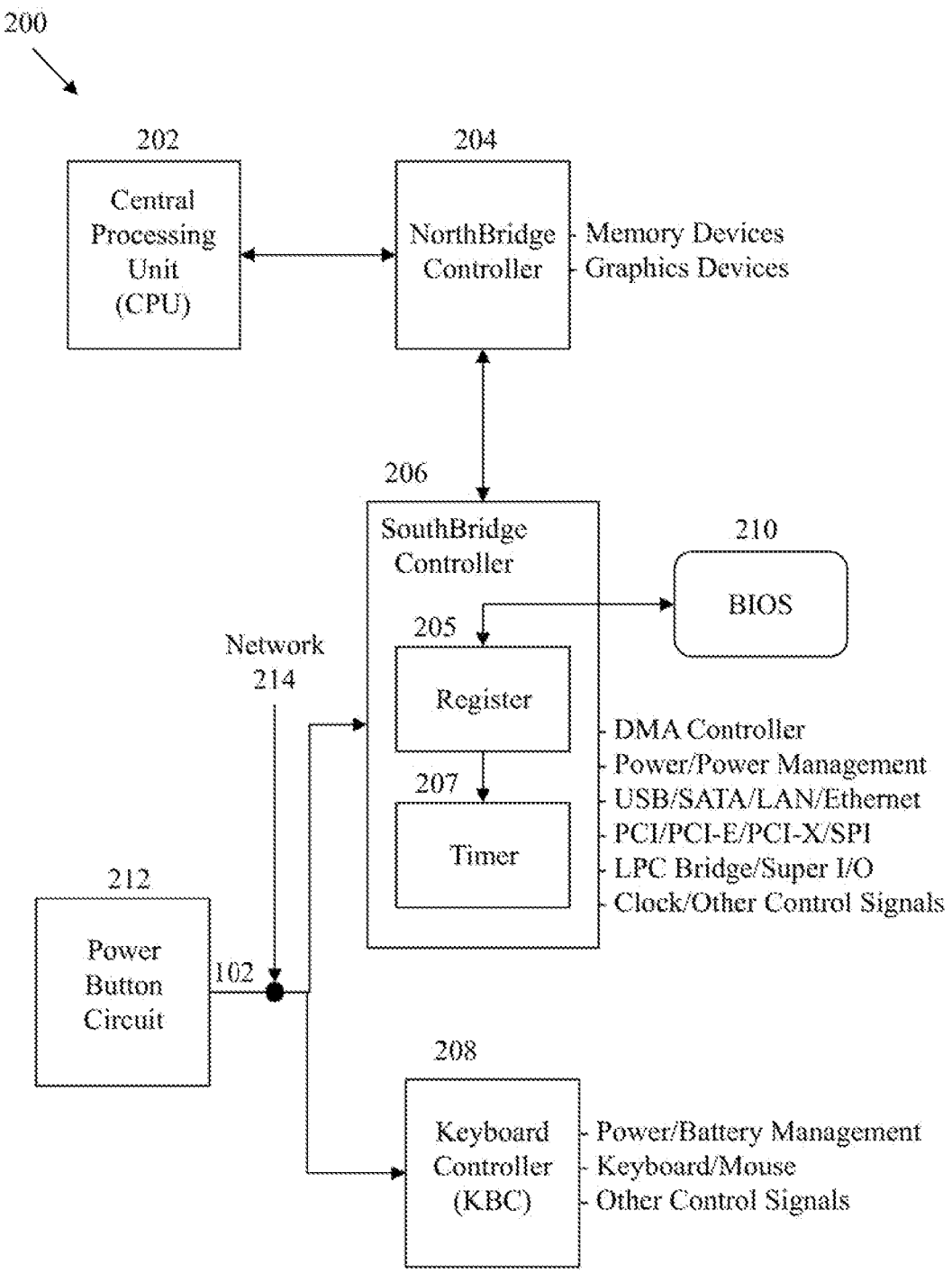
FIG. 2 is one example of a first apparatus for blocking a power-transition.

FIG. 2 is one example of a first apparatus 200 for blocking a power-transition. The first apparatus 200 is a computer which includes: a CPU 202, a northbridge controller 204, a southbridge controller 206, a keyboard controller 208, a BIOS 210, and a power-button circuit 212. The computer 200 is also connected to a network 214.

While the computer 200 architecture shown conforms to a northbridge-southbridge design, other architectures are also possible, and can effect the present invention. The northbridge controller 204 (a.k.a. Memory Controller Hub (MCH) or an Integrated Memory Controller (IMC)) manages the "faster" signals between the CPU 202, various memory or cache devices, graphics devices as well as the southbridge controller 206. The southbridge controller 206 (a.k.a. I/O Controller Hub (ICH), or Platform Controller Hub (PCH)) manages the "slower" signals of the computer 200, including: the BIOS 210, DMA Controllers, Power/Power Management, USB/SATA/LAN/Ethernet, PCI/PCI-E/PCI-X/SPI, LPC Bridge, Clock/Other Control Signals, and the keyboard controller 208 (over the LPC Bridge). BIOS is often connected to southbridge through an SPI interface.

The keyboard controller 208 (a.k.a. Embedded Controller (EC)) manages signals for a keyboard, mouse, peripheral bus, battery management, power control, and other internal functions.

The power-button circuit 212 includes a power-button. The power-button circuit 212 transmits a power-transition signal 102 (e.g. a PWRBTN# signal in some computers) to both the keyboard controller 208 and the southbridge controller 206 whenever the power-button in the in the power-button circuit 212 is being pressed.

The keyboard controller 208 and the southbridge controller 206 are both coupled (e.g. logically or physically wired) to receive the power-transition signal 102 from the power-button circuit 212, or alternatively from the network 214.

The keyboard controller 208 includes a first (default) state which permits the keyboard controller 208 to institute a normal "power-off" sequence in the first apparatus 200, in response to the power-transition signal 102. The southbridge controller 206 also includes a first (default) state, based on a first (default) state of a register 205, which permits the southbridge controller 206 to initiate a timer 207 which monitors how long the power-transition signal 102 is present (e.g. how long the power-button remains "pressed") and institutes a forced power-transition sequence" (e.g. a "hard-reset") after a predetermined time period has elapsed (typically 4-seconds).

The keyboard controller 208 includes a second state in which the power-transition signal 102 from the power-button circuit 212 is blocked from instituting the normal "power-off" sequence. The southbridge controller 206 also includes a second state, based on a second state of the register 205, which is programmed to either: block the southbridge controller 206 from initiating the timer 207 for monitoring how long the power-transition signal 102 is present; or alternatively increases the predetermined time period which must elapse before the forced power-transition sequence is instituted by the timer 207. These first and second states can be selected using registers in the keyboard controller 208 and the southbridge controller 206.

The keyboard controller 208 and the southbridge controller 206 are coupled to receive commands from the BIOS 210. The BIOS 210 functions as the power control module 104 and commands the keyboard controller 208 and the southbridge controller 206 into their first states, if a present-state of the first apparatus 200 is not one of the blocked power-transition states 108. However, the BIOS 210 commands the keyboard controller 208 and the southbridge controller 206 into their second states, if the present-state of the first apparatus 200 is one of the blocked power-transition states 108.

Thus, if the keyboard controller 208 and the southbridge controller 206 are in their first states and the power-transition signal 102 is received, then either the normal or forced "power-off" sequence is instituted. However, if the keyboard controller 208 and the southbridge controller 206 are in their second states and the power-transition signal 102 is received, then the normal or forced "power-off" sequence is either: completely blocked; or blocked for a longer time period than normal.

The BIOS 210 can also modify the "predetermined time period" which must elapse before the southbridge controller 206 institutes the forced power-transition sequence" (e.g. the "hard-reset"). For example, a part of a BIOS-update, the BIOS can reprogram the southbridge controller 206 timer period to a time period greater than an estimated time for the BIOS-update to be completed. Thus the timer period, can vary with the complexity of the BIOS-update, where simpler/quicker BIOS-updates extend the timer period less than more complex/slower BIOS-updates.

Figure 3:
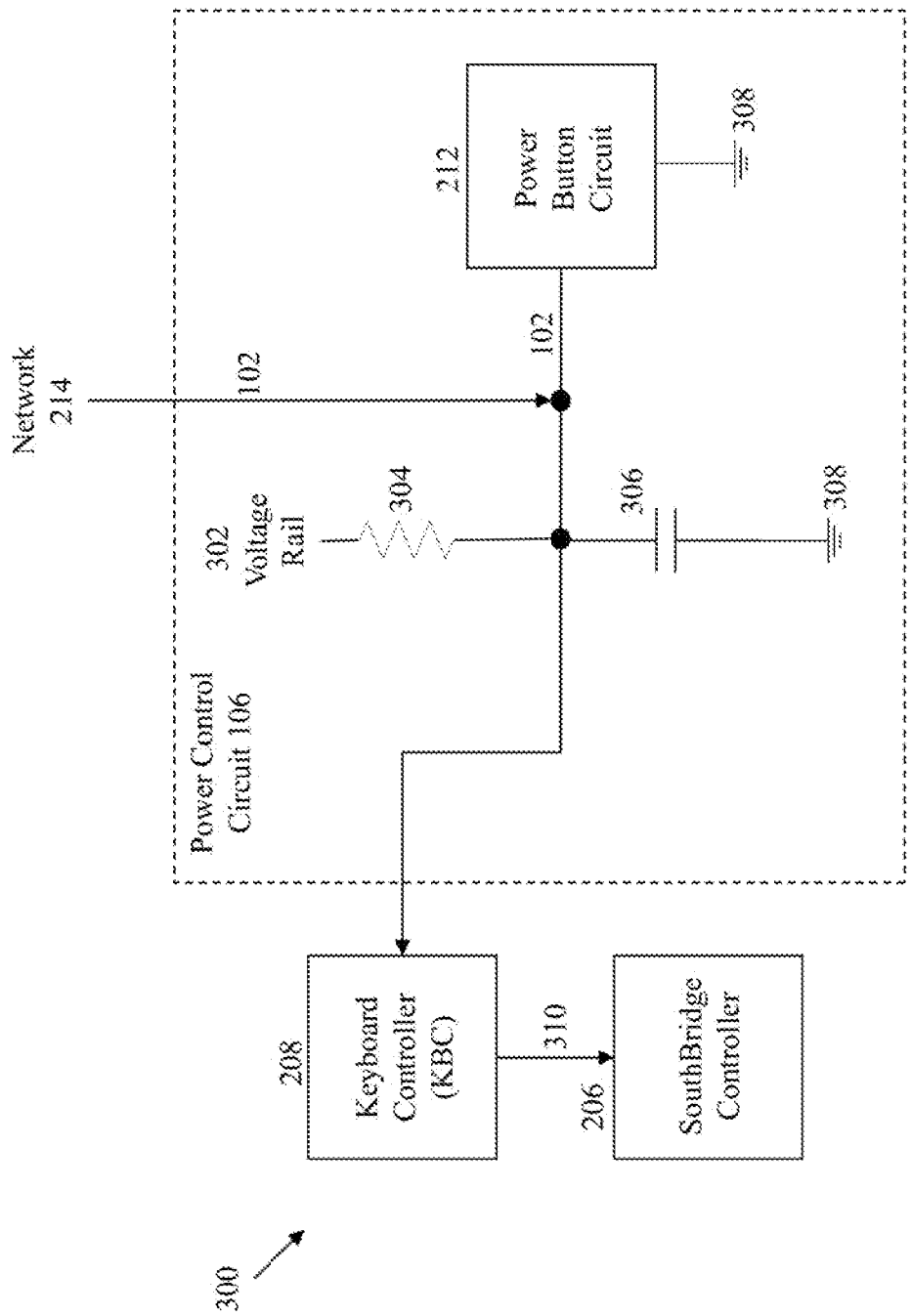
FIG. 3 is one example of a second apparatus for blocking a power-transition.

FIG. 3 is one example of a second apparatus 300 for blocking a power-transition. The second apparatus 300 essentially retains the same northbridge-southbridge architecture of the first apparatus 200, but with a few modifications. One modification includes replacing the power-button circuit 212 of the first apparatus 200 with a more complex power control circuit 106. Also, the southbridge controller 206 is coupled to the keyboard controller 208 with a pass-through signal line 310. In one example, the pass-through signal line 310 couples the southbridge controller 206 and the keyboard controller 208 using GPIO (i.e. General Purpose Input/Output) pins on each controller 206 and 208. GPIO pins are programmable and can act as either input pins, for reading signals, or as output pins, for transmitting signals.

The power control circuit 106 in the second apparatus 300 includes: the power-button circuit 212, a voltage rail 302, a pull-up resistor 304, an isolation capacitor 306, and a ground 308. The power-transition signal 102 is a ground 308 signal generated either when the power-button in the in the power-button circuit 212 is being pressed, or alternatively, is received from the network 214. The voltage rail 302, pull-up resistor 304, and isolation capacitor 306 help stabilize and remove noise from the power control circuit 106 as the power-button is pressed and released.

The keyboard controller 208 is coupled to directly receive the power-transition signal 102 from the power control circuit 106. The southbridge controller 206 is not coupled to directly receive the power-transition signal 102 from the power control circuit 106, but instead receives the power-transition signal 102 from the keyboard controller 208 over the pass-through signal line 310. Thus, in effect, the keyboard controller 208 functions as a type of "blocking switch" with respect to the southbridge controller 206.

The keyboard controller 208 includes a first (default) state which enables the power-transition signal 102 from the power-button circuit 212 to be passed-through the keyboard controller 208 to the southbridge controller 206 over the pass-through signal line 310. The keyboard controller 208 includes a second state in which the power-transition signal 102 from the power-button circuit 212 is blocked from being transmitted to the southbridge controller 206 over the pass-through signal line 310.

The keyboard controller 208 is coupled to receive commands from the BIOS 210 through the southbridge controller 206. The BIOS 210 commands the keyboard controller 208 into the first state, if a present-state of the second apparatus 300 is not one of the blocked power-transition states 108. The BIOS 210 commands the keyboard controller 208 into the second state, if the present-state of the second apparatus 300 is one of the blocked power-transition states 108.

If the keyboard controller 208 is in the first state and the power-transition signal 102 is received, then the power-transition signal 102 is passed on to the southbridge controller 206, thereby permitting either a normal or forced "power-off" sequence to be instituted. In other words, in the first state the southbridge controller 206 "power-button pressed" timer can monitor the duration of the power-transition signal 102 (e.g. how long the power-button is pressed) and, if the time limit is reached, effect a forced power-transition (e.g. forced power-off) of the second apparatus 300.

However, if the keyboard controller 208 is in the second state and the power-transition signal 102 is received, then the power-transition signal 102 is blocked from being passed on to the southbridge controller 206, thereby blocking either a normal or forced "power-off" sequence from being instituted. In other words, in the second state the southbridge controller 206 "power-button pressed" timer can not monitor the duration of the power-transition signal 102 (e.g. how long the power-button is pressed) and, thus a forced power-transition (e.g. forced power-off) of the second apparatus 300 can not be effected.

Figure 4:
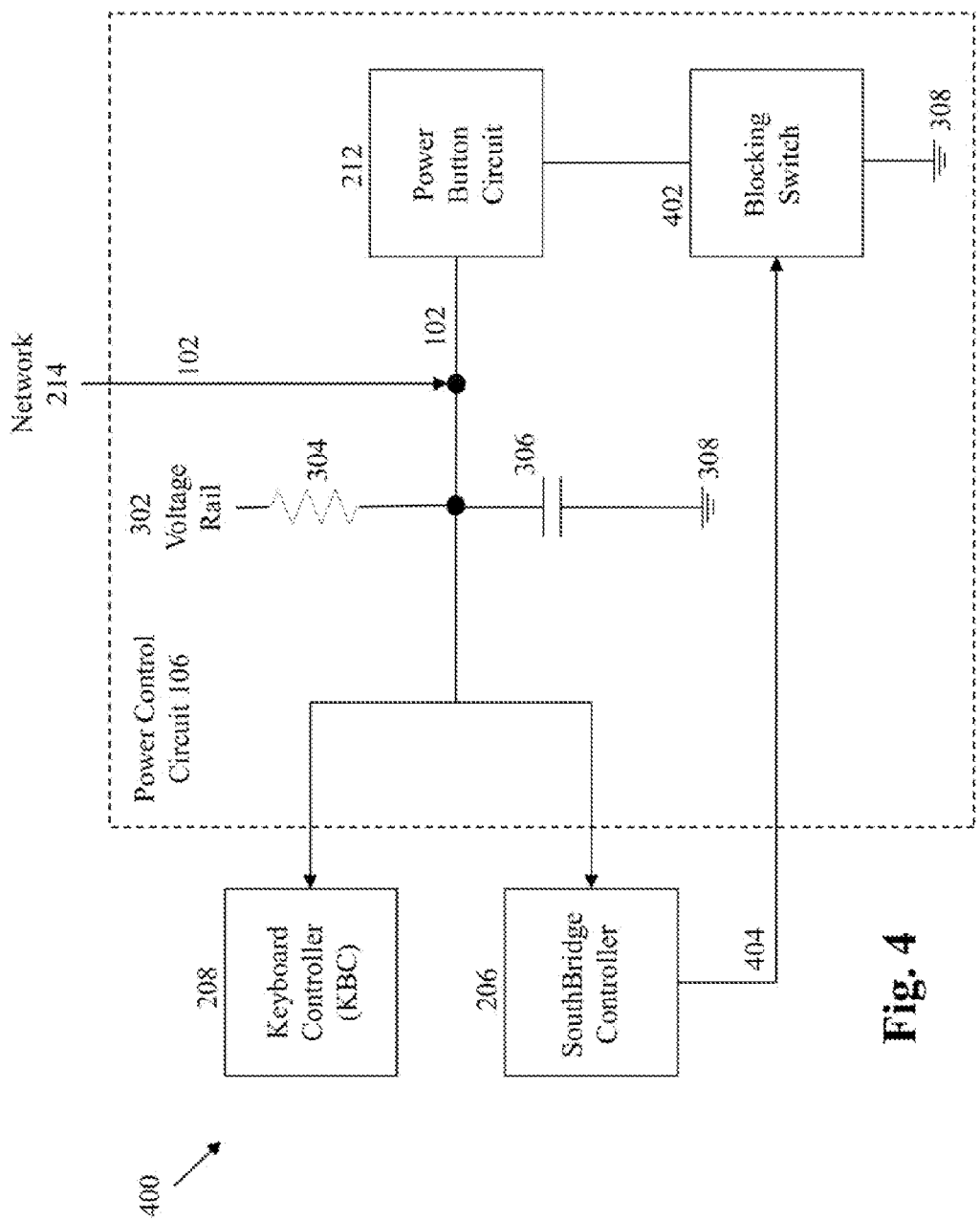
FIG. 4 is one example of a third apparatus for blocking a power-transition.

FIG. 4 is one example of a third apparatus 400 for blocking a power-transition. The third apparatus 400 also essentially retains the same northbridge-southbridge architecture of the first apparatus 200, but with a few modifications. One modification includes replacing the power-button circuit 212 of the first apparatus 200 with a more complex power control circuit 106.

The power control circuit 106 in the third apparatus 400 includes: the power-button circuit 212, the voltage rail 302, the pull-up resistor 304, the isolation capacitor 306, the ground 308, and a blocking switch 402. The blocking switch 402 is controlled by a blocking signal 404 transmitted from a GPIO pin on the southbridge controller 206. The blocking switch 402 can be located in the third apparatus' 400 chip-set or in the mother-board.

The power-transition signal 102 is a ground 308 signal generated when the power-button in the in the power-button circuit 212 is being pressed and the blocking switch 402 is set to couple the power-button circuit 212 to the ground 308. Alternatively, the power-transition signal 102 can be received from the network 214. The voltage rail 302, pull-up resistor 304, and isolation capacitor 306 help stabilize and remove noise from the power control circuit 106 as the power-button is pressed and released and the blocking switch 402 is closed or opened. The keyboard controller 208 and the southbridge controller 206 are both coupled to receive the power-transition signal 102.

The blocking switch 402 includes a first (default) state which enables the power-button circuit 212 to connect to the ground 308. The blocking switch 402 includes a second state in which the power-button circuit 212 is blocked from connecting to the ground 308, thus preventing the power-button circuit 212 from generating the power-transition signal 102.

The southbridge controller 206 is coupled to receive commands from the BIOS 210. The BIOS 210 commands the southbridge controller 206 to put the blocking switch 402 into the first state, if a present-state of the third apparatus 400 is not one of the blocked power-transition states 108. The BIOS 210 commands the southbridge controller 206 to put the blocking switch 402 into the second state, if the present-state of the third apparatus 400 is one of the blocked power-transition states 108.

If the blocking switch 402 is in the first state, then the power-button circuit 212 is connected to the ground 308 and the power-transition signal 102 can be generated by the power-button circuit 212, thereby permitting either a normal or forced "power-off" sequence to be instituted. However, if the blocking switch 402 is in the second state, then the power-button circuit 212 is not connected to the ground 308 and the power-transition signal 102 can not be generated by the power-button circuit 212, thereby blocking either a normal or forced "power-off" sequence from being instituted.

Figure 5:
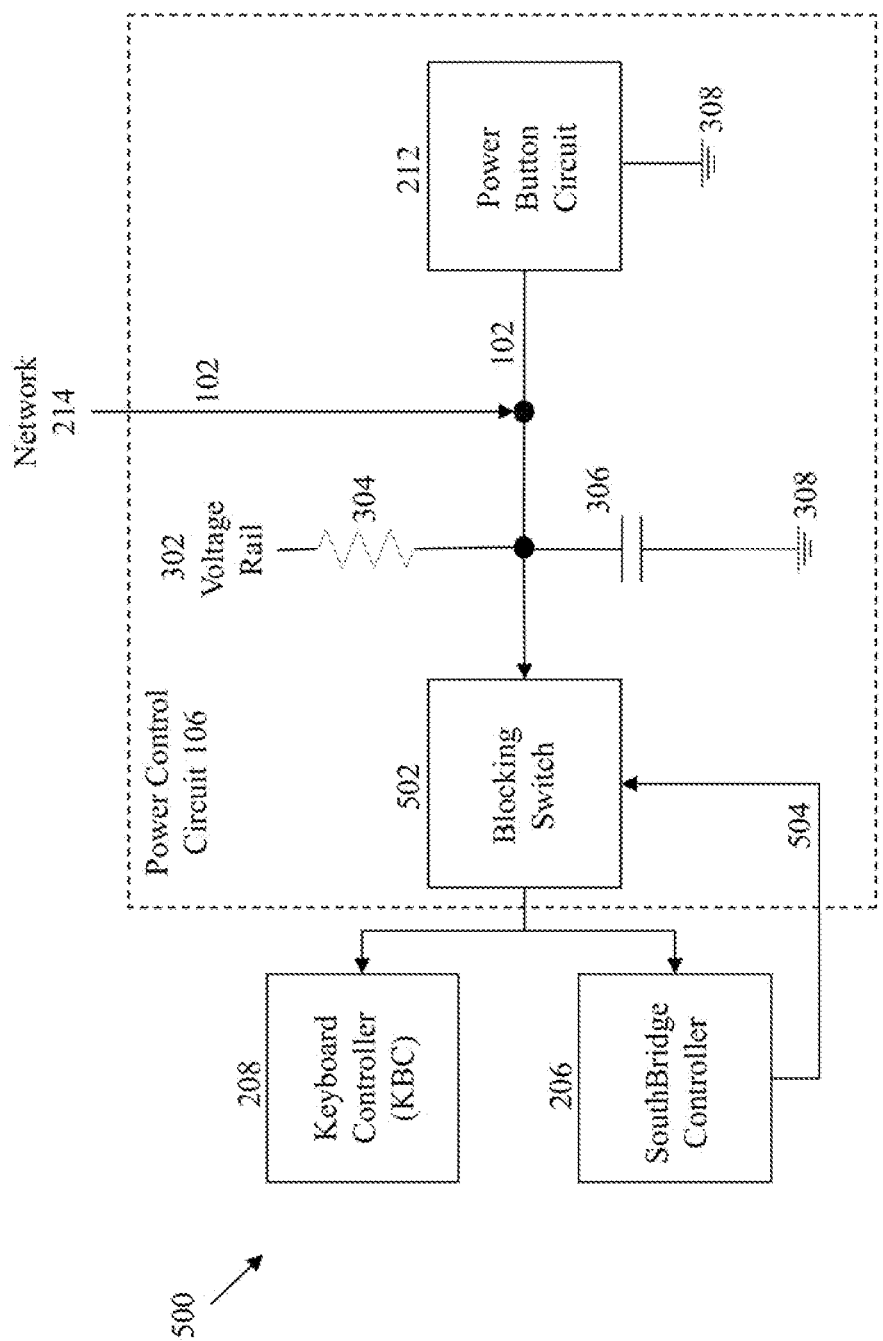
FIG. 5 is one example of a fourth apparatus for blocking a power-transition.

FIG. 5 is one example of a fourth apparatus 500 for blocking a power-transition. The fourth apparatus 500 also essentially retains the same northbridge-southbridge architecture of the first apparatus 200, but with a few modifications. One modification includes replacing the power-button circuit 212 of the first apparatus 200 with a more complex power control circuit 106.

The power control circuit 106 in the fourth apparatus 500 includes: the power-button circuit 212, the voltage rail 302, the pull-up resistor 304, the isolation capacitor 306, the ground 308, and a blocking switch 502. The blocking switch 502 is controlled by a blocking signal 504 transmitted from a GPIO pin on the southbridge controller 206. The blocking switch 502 can be located in the fourth apparatus' 500 chipset or in the mother-board.

The power-transition signal 102 is a ground 308 signal generated either when the power-button in the in the power-button circuit 212 is being pressed, or alternatively, is received from the network 214. The voltage rail 302, pull-up resistor 304, and isolation capacitor 306 help stabilize and remove noise from the power control circuit 106 as the power-button is pressed and released, and the blocking switch 502 is closed or opened.

The blocking switch 502 is coupled to receive the power-transition signal 102 from the power-button circuit 212 in the power control circuit 106, or from the network 214. The keyboard controller 208 and the southbridge controller 206 are coupled to receive signals from the blocking switch 502.

The blocking switch 502 includes a first (default) state which enables keyboard controller 208 and southbridge controller 206 to receive the power-transition signal 102 from the power-button circuit 212, or from over the network 214. The blocking switch 502 includes a second state in which the keyboard controller 208 and southbridge controller 206 are blocked from receiving the power-transition signal 102.

The southbridge controller 206 is coupled to receive commands from the BIOS 210. The BIOS 210 commands the southbridge controller 206 to put the blocking switch 502 into the first stale, if a present-state of the fourth apparatus 500 is not one of the blocked power-transition states 108. The BIOS 210 commands the southbridge controller 206 to put the blocking switch 502 into the second state, if the present-state of the fourth apparatus 500 is one of the blocked power-transition states 108.

If the blocking switch 502 is in the first state, then the power-transition signal 102 is routed to the keyboard controller 208 and southbridge controller 206, thereby permitting either a normal or forced "power-off" sequence to be instituted. However, if the blocking switch 502 is in the second state, then the keyboard controller 208 and southbridge controller 206 are blocked from receiving the power-transition signal 102, thereby blocking either a normal or forced "power-off" sequence from being instituted.

Figure 6:
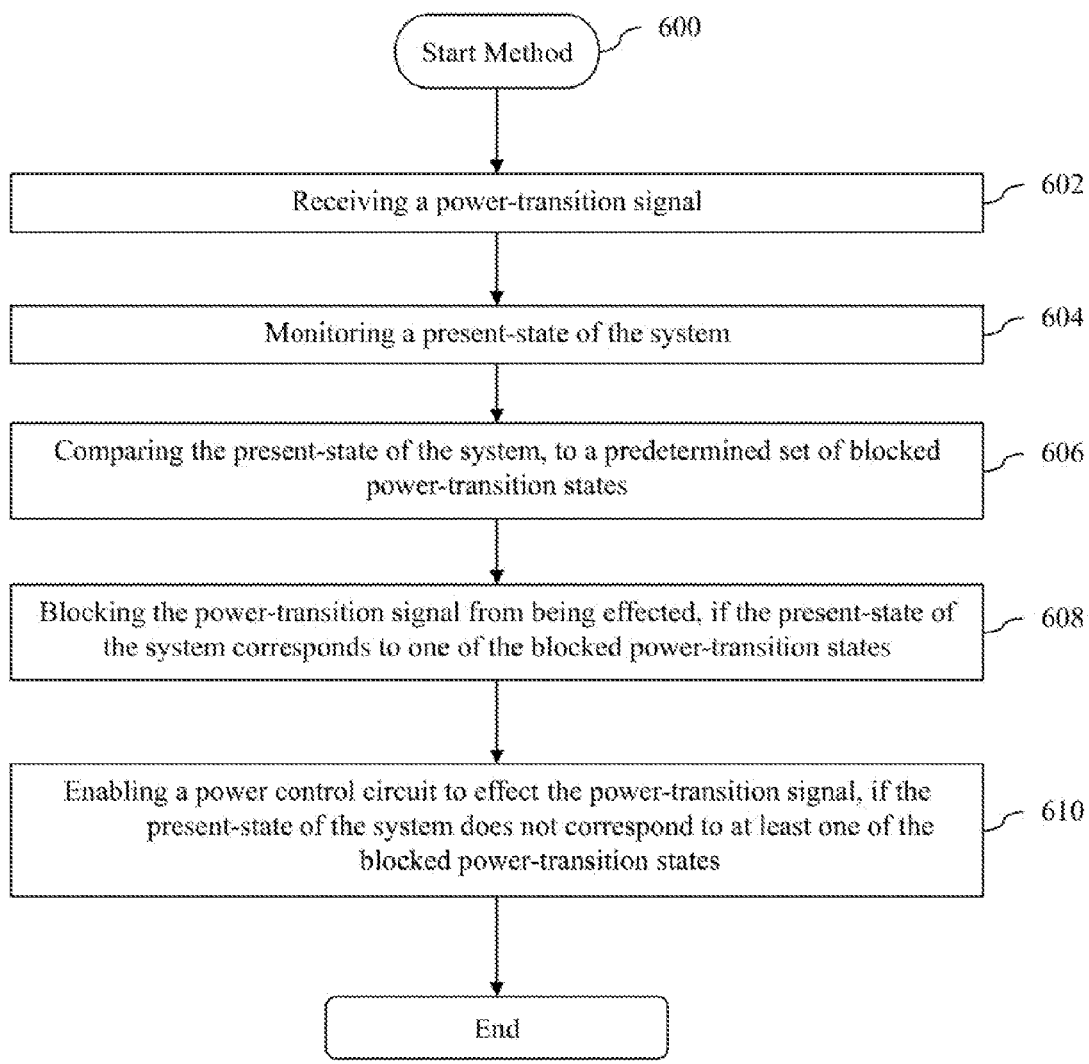
FIG. 6 is a flowchart of one example of a method for blocking a power-transition.

FIG. 6 is a flowchart of one example of a method 600 for blocking a power-transition. Those skilled in the art will recognize that while one example of the present invention's method is now discussed, the material in this specification can be combined in a variety of ways to yield other examples as well. The method blocks next discussed are to be understood within a context provided by this and other portions of this detailed description.

The method 600 begins in block 602, wherein a power control module 104 receives a power-transition signal 102. Next, in block 604, the power control module 104 monitors a present-state of the system 100. In block 606, the power control module 104 compares the present-state of the system 100 to a predetermined set of blocked power-transition states 108. Next in block 608, the power control module 104 blocks a power control circuit 106 from effecting the power-transition signal 102 if the present-state of the system 100 corresponds to at least one of the blocked power-transition states 108. In block 610, the power control module 104 enables a power control circuit 106 to effect the power-transition signal 102 if the present-state of the system 100 does not correspond to at least one of the blocked power-transition states 108.

A set of files refers to any collection of files, such as a directory of files. A "file" can refer to any data object (e.g., a document, a bitmap, an image, an audio clip, a video clip, software source code, software executable code, etc.). A "file" can also refer to a directory (a structure that contains other files).

Instructions of software described above are loaded for execution on a processor (such as one or more CPUs). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations thereof. It is intended that the following claims cover such modifications and variations as fall within the true spirit and scope of the invention.

What is claimed is:

1. A system for blocking a power transition within a computer, comprising:
   a power button;
   a power control circuit;
   a controller; and
   a power control module to:
      compare a present state of the computer to a predetermined set of blocked power-transition states; and
      selectively set the power control circuit to a first mode in response to the comparing indicating that the present state is one of the blocked power-transition states, and selectively set the power control circuit to a second mode in response to the comparing indicating that the present state is not one of the blocked power-transition states,
   wherein the power control circuit is to:
      if the power control circuit is in the first mode, disable a power transition indication from being provided to the controller in response to user actuation of the power button, and
      if the power control circuit is in the second mode, provide the power transition indication to the controller in response to user actuation of the power button,
      wherein the controller is responsive to receipt of the power transition indication to transition the computer from the present state to a lower power state.

2. The system of claim 1:
   wherein the lower power state is selected from among a power-off state, a standby state, and a sleep-mode state.

3. The system of claim 1:
   wherein the blocked power-transition states include at least one from a group including:
      BIOS update;
      a boot-block update;
      a computer element is in a current predetermined state;
      a computer element is transitioning between operational states;
      a computer element is being loaded, installed, updated, repaired, or restored within the computer;
      a predetermined computer code is executing;
      a predetermined computer hardware is in a predetermined operational state;
      the computer is in one or more predefined temporal states; and
      the computer is in one or more predefined network states.

4. The system of claim 1:
   wherein the power control circuit is to enable a power transition from a power-on state to a power-off state if the present state of the computer is one from a group including: a non-functional state, an error state, and a hung state.

5. An apparatus for blocking a power transition within a computer, comprising:
   a blocking circuit; and
   a power control module having:
      instructions for setting the blocking circuit to a first mode in response to determining that a present state of the computer is one of blocked power-transition states; and
      instructions for setting the blocking circuit to a second mode in response to determining that the present state is not one of the blocked power-transition states,
   wherein the blocking circuit is to:
      if the blocking circuit is in the first mode, disable a power transition indication from being provided to a controller in the computer in response to user actuation of a power button in the computer, and
      if the blocking circuit is in the second mode, provide the power transition indication to the controller in response to user actuation of the power button,
      wherein providing the power transition indication to the controller is to cause the controller to transition the computer from the present state to a lower power state.

6. The apparatus of claim 5:
   wherein the blocking switch is included in a keyboard controller.

7. The apparatus of claim 5:
   wherein the power control module is part of a BIOS.

8. The system of claim 1, wherein the power transition indication is a power transition signal activated by user actuation of the power button, wherein the power control circuit includes a blocking circuit that is selectively settable to one of the first mode and the second mode, wherein the blocking circuit in the first mode is to block the power transition signal activated by user actuation of the power button from being passed to the controller, and wherein the blocking circuit in the second mode is to pass the power transition signal activated by user actuation of the power button to the controller.

9. The system of claim 1, wherein the power control circuit includes a blocking circuit that is selectively settable to one of the first mode and the second mode, wherein the blocking circuit in the first mode is to prevent generation of the power transition indication in response to user actuation of the power button, and wherein the blocking circuit in the second mode is to generate the power transition indication in response to user actuation of the power button.

10. The system of claim 1, wherein the predetermined set of blocked power-transition states includes a boot code update state corresponding to a condition when boot code in the computer is being updated, and
    wherein the power control module is to set the power control circuit to the first mode in response to the comparing indicating that the present state is the boot code update state.

11. The system of claim 10, wherein the boot code is one of BIOS code and boot-block code.

12. The system of claim 10, wherein the power control module is part of the boot code.

13. The apparatus of claim 5, wherein the power transition indication is a power transition signal activated by user actuation of the power button, wherein the blocking circuit in the first mode is to block the power transition signal activated by user actuation of the power button from being passed to the controller, and wherein the blocking circuit in the second mode is to pass the power transition signal activated by user actuation of the power button to the controller.

14. The apparatus of claim 5, wherein the blocking circuit in the first mode is to prevent generation of the power transition indication in response to user actuation of the power button, and wherein the blocking circuit in the second mode is to generate the power transition indication in response to user actuation of the power button.

15. The apparatus of claim 5, wherein the blocked power-transition states include a boot code update state corresponding to a condition when boot code in the computer is being updated, and wherein the power control module is to set the blocking circuit to the first mode in response to the present state being the boot code update state.

* * * * *

UNITED STATES PATENT AND TRADEMARK OFFICE
CERTIFICATE OF CORRECTION

PATENT NO. : 8,868,940 B2  Page 1 of 1
APPLICATION NO. : 13/386132
DATED : October 21, 2014
INVENTOR(S) : Richard H. Hodge et al.

It is certified that error appears in the above-identified patent and that said Letters Patent is hereby corrected as shown below:

On the Title Page, item (54), and in the Specification, column 1, line 3, Title, delete "COMPARISION" and insert -- COMPARISON --, therefor.

Signed and Sealed this
Third Day of March, 2015

Michelle K. Lee
*Deputy Director of the United States Patent and Trademark Office*